United States Patent

Lindgren

Patent Number: 6,097,835
Date of Patent: Aug. 1, 2000

[54] PROJECTIVE PAN SHARPENING METHODS AND APPARATUS

[75] Inventor: John E. Lindgren, San Jose, Calif.

[73] Assignee: Lockheed Martin Corporation, Sunnyvale, Calif.

[21] Appl. No.: 08/898,814

[22] Filed: Jul. 23, 1997

[51] Int. Cl.[7] .................................. G06K 9/00; H04N 7/18
[52] U.S. Cl. ............................................. 382/162; 348/147
[58] Field of Search ..................................... 382/191, 294, 382/299, 300; 348/143, 144, 147, 606, 625; 356/402, 406, 416, 419

[56] References Cited

U.S. PATENT DOCUMENTS 4,683,496   7/1987   Tom ........................................ 358/166

OTHER PUBLICATIONS

William H. Press, Numerical Recipes,The Art of Scientic Computing,1986,504–505, Cambridge Univ.
William K. Pratt, Digital Image Processing,1991,441–445, John Wiley & Sons, Inc.
John C. Price, Combining Panchromatic and Multispectral Imagery from Dual ResolutionSatellite Instruments, Remote Sensing of Environment, 1997,119–128.
D. Pradines, Improving Spot Images Size and Multispectral Resolution, SPIE vol. 660, Earth Remote Sensing Using the Landsat Thematic Mapper and SPOT Sensor Systems (1986).

Primary Examiner—Amelia Au
Assistant Examiner—F. E. Cooperrider
Attorney, Agent, or Firm—Feix & Feix

[57] ABSTRACT

A projective panchromatic sharpening method and apparatus combines registered high spatial resolution panchromatic imagery and lower spatial resolution multispectral imagery to synthesize higher spatial resolution multispectral imagery. The degree of misregistration between bands and the correlation of intensity values are key factors in generating radiometrically accurate and visually crisp output images. The projective panchromatic sharpening method and apparatus comprises two components. The first component determines the linear radiometric relationship between the panchromatic and multispectral bands, and the second component processes pixels to produce the sharpened product.

20 Claims, 4 Drawing Sheets

FIG_1

FIG_2

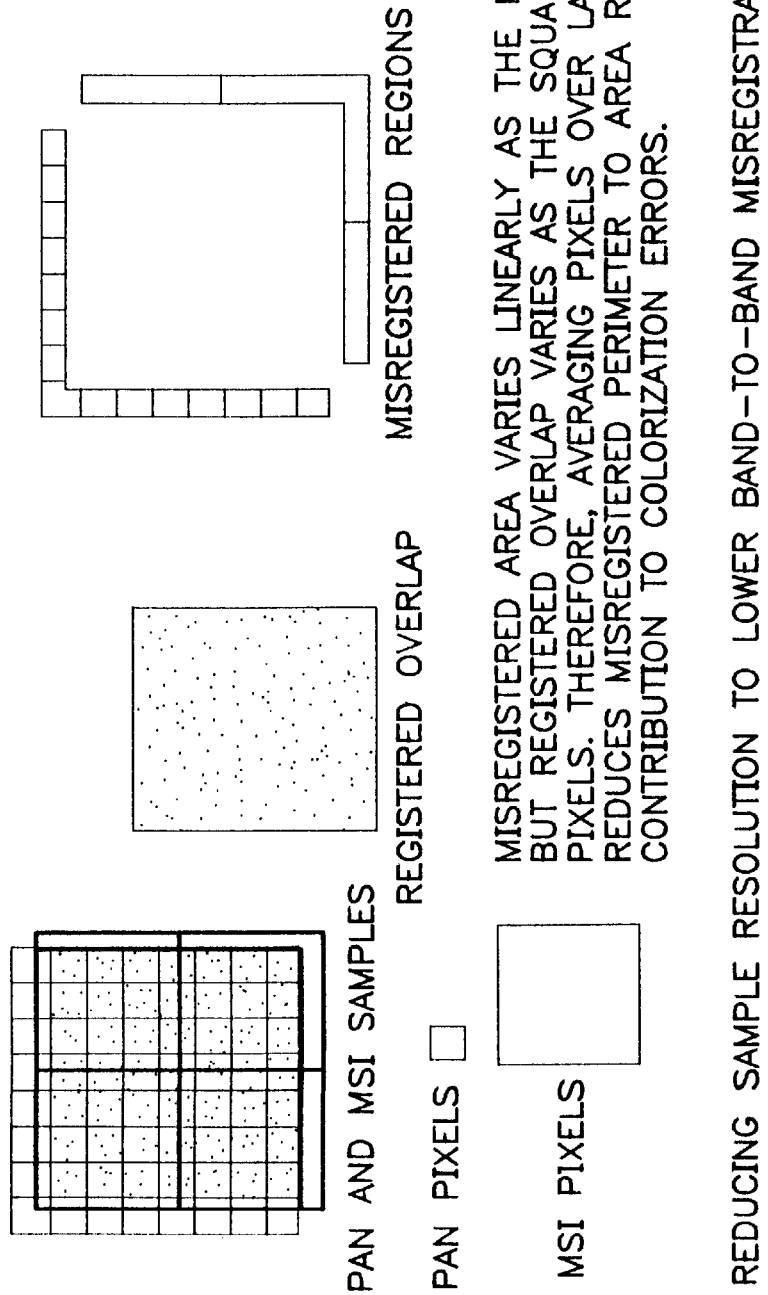

PROJECTIVE PAN SHARPENING METHODS AND APPARATUS

BACKGROUND OF THE INVENTION

This invention relates to sharpening the spatial resolution of multispectral imagery.

This invention relates particularly to methods and apparatus of combining registered high spatial resolution panchromatic imagery and lower spatial resolution multispectral imagery to synthesize higher spatial resolution multispectral imagery.

When collecting images on the Earth for mapping purposes, there are practical and economic benefits if high resolution multispectral (color) imagery can be generated with lower resolution sensors. Less expensive products can be used and smaller transmission bandwidths from the satellites can be used, if lower resolution multispectral imagery can be synthesized to higher spatial resolution multispectral imagery.

It is known, in general, that registered high spatial resolution panchromatic imagery can be combined with lower spatial resolution multispectral imagery to synthesize higher resolution multispectral imagery. But obtaining satisfactory results can be a problem using various prior art techniques.

The degree of misregistration between bands and the correlation of intensity values are key factors in generating radiometrically accurate and visually crisp output images.

When the collected registered panchromatic data is registered (spectrally and spatially) so that the panchromatic data both covers the spectral range of sensitivity of each of the multispectral bands and also covers the same physical image location on the Earth, it is possible to generate high resolution multispectral imagery with lower resolution multispectral sensors using the methods and apparatus of the present invention.

The methods and apparatus of the present invention weigh the intensity values of the multispectral imagery according to how the colors (multispectral imagery) act relative to the panchromatic imagery, rather than how a single color acts relative to the panchromatic imagery.

The methods and apparatus of the present invention use all the colors for each of the sharpening steps.

The present invention creates an ensemble to sharpen just the right color. The present invention uses color intensity as it applies to the over all image and also uses color intensity as it applies to a particular sub-pixel in the over all image.

The present invention provides a model for how the color intensities are related to the panchromatic intensities as a complete set, and the model functions as an ensemble rather than as individual colors.

In the present invention a particular color band is not really head-to-head correlated; but, as part of a group, it becomes better correlated in accordance with the present invention.

The present invention also can tolerate more misregistration than the correlation methods and apparatus used prior to the present invention.

SUMMARY OF THE PRESENT INVENTION

The method and apparatus of the present invention combine registered high spatial resolution panchromatic imagery and lower spatial resolution multispectral imagery to synthesize higher spatial resolution multispectral imagery, In the present invention high spatial resolution panchromatic imagery is collected and lower spatial resolution multispectral imagery is collected.

There are two components to the projective pan sharpening methods and apparatus of the present invention.

The first component determines the linear radiometric relationship between the panchromatic and the multispectral bands.

The second component processes pixels to produce the sharpened product.

In the first component the collected imagery is linear spectral model initialized.

This initializing comprises generating uniformity distributed registered panchromatic and multispectral image samples from the collected panchromatic imagery and the collected multispectral imagery. Color weights are determined from the generated panchromatic and multispectral image samples to provide a weighting vector which is normal to a panchromatic hyperplane containing multispectral imagery intensity vectors.

The second component is then panchromatic sharpening pixel processing the multispectral imagery by using the determined color weights.

This panchromatic sharpening pixel processing comprises resampling the collected multispectral imagery to panchromatic imagery resolution. The resampled multispectral imagery is then projected onto the particular hyperplane associated with overlapped panchromatic pixel intensity and the weighting vector to adjust the intensities of the resampled multispectral imagery to the closest model intensity contained in the hyperplane. This produces a synthesized multispectral imagery which is sharpened to have substantially the spatial resolution of the panchromatic imagery.

The adjusted intensities of the resampled multispectral imagery are then clamped to a feasible output range.

The clamped adjusted intensities are then output as a sharpened multispectral Imagery.

Methods and apparatus which incorporate the features described above and which are effective to function as described above comprise additional, specific objects of the present invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the alt without departing from the present invention and the purview of the appended claims.

BRIEF DESCRIPTION OF THE DRAWING VIEWS

FIG. 4 shows reducing sample resolution to lower band-to-band misregistration effects.

DETAILED DESCRIPTION OF PREFERRED EMBODIMENTS

The main idea of pan sharpening is to combine registered high spatial resolution panchromatic (pan) and lower spatial resolution multispectral imagery to synthesize higher resolution multispectral imagery. The degree of misregistration between bands and the correlation of intensity values are key factors in generating radiometrically accurate and visually crisp output images.

There are two components to the Projective Pan Sharpening method. The first component determines the linear radiometric relationship between the pan and multispectral bands and the second processes pixels to produce the sharpened product. The Projective Pan Sharpening method will be ideally suited for generating multispectral products using Lockheed Martin Commercial Remote Sensing System (CRSS) imagery.

It is well documented (in D. Padinies, "Improving SPOT Image Sizes and Resolutions," SPIE, Vol. 660, Earth Remote Sensing Using Landsat Thematic Mapper and SPOT Sensor Systems, pp. 98–102, 1986, and in J. C. Price, "Combining Panchromatic and Multispectral Imagery from Dual Resolution Satellite Instruments," Remote Sensing of Environment, 21: pp. 119–128, 1987) that it is possible to synthesizue high-resolution multispectral (MSI) imagery using registered higher spatial resolution panchromatic (pan) imagery with lower spatial resolution MSI imagery.

Both the D. Padines document and the J. C. Price document are incorporated by reference in this application.

For many types of applications this type of "colorization" process uses actual scene data to determine the true colors of each pan pixel with a very low error rate. However, for certain applications this process may produce unsatisfactory results.

Figure 3:
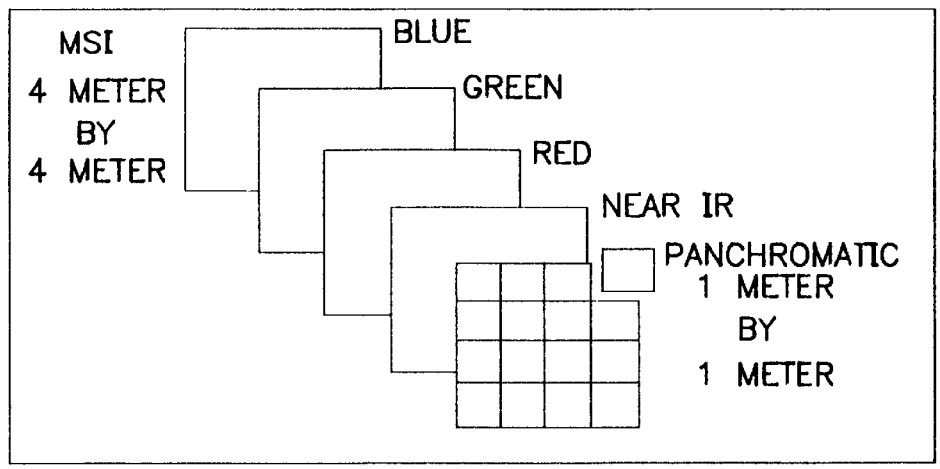
FIG. 3 shows the CRSS spatial and spectral overlaps.

The spatial and spectral relationship of imaging pixels for the Lockheed Martin Commercial Remote Sensing System (CRSS) is illustrated in FIG. 3 of the drawings.

LINEAR SPECTRAL MODEL

The projective pan sharpening method assumes nearly complete spectral overlap between pan and multispectral bands, spatially registered pixels with allowances for slight misregistration, and a linear relationship between intensities in the pan and multispectral bands. The CRSS multispectral and pan bands meet these assumptions quite well.

Given n multispectral bands and a pan band meeting the above assumptions, let us denote a pan pixel intensity value, p, and spatially overlapping MSI intensity values, $m_i$, where i=0, ..., n-1. The linear spectral model is mathematically expressed as, $$p = b + \sum_{0 \le i < n} w_i m_i + \varepsilon = b + \vec{w}^T \vec{m} + \varepsilon. \quad (1)$$

where $\vec{m}$ is a column vector of MSI intensities, b is a constant additive bias in pan intensity values, and $\varepsilon$ is an error term. The linear spectral model assumes the pan and MSI intensity values have been resampled to a common spatial resolution.

Equation (1) has a simple multispectral vector space geometric interpretation. The vector $\vec{w}$ is normal to the hyperplane containing MSI intensity vectors at a distance $(p-b)/|\vec{w}|$ from the origin.

PROJECTIVE PAN SHARPENING STEPS

Figure 1:
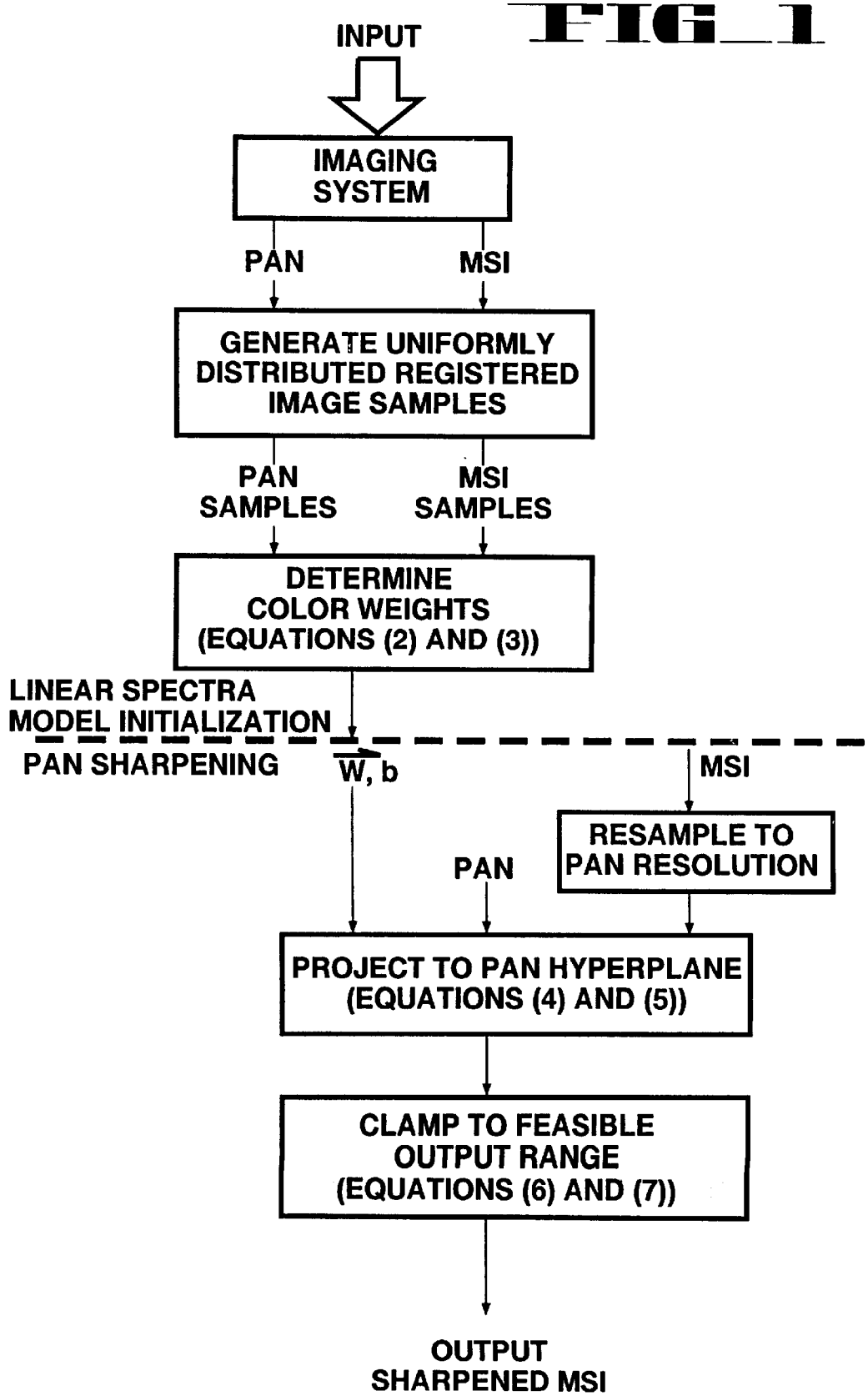
FIG. 1 is a diagram illustrating the projective pan sharpening method of the present invention.

The projective pan sharpening method of the present invention is divided into two parts. The first step, linear spectral model initialization, uses data from small sample areas in the scene to determine the linear model weights, ($\vec{w}$,b), in equation (1). Secondly, for pan sharpening pixel processing, the MSI images are resampled to the pan image resolution and projected onto the hyperplane associated with overlapping pan pixel intensity, p-b, and "normal" vector, $\vec{w}$. FIG. 1 illustrates the linear spectral model initialization and pan sharpening pixel processing steps.

LINEAR SPECTRAL MODEL INITIALIZATION

In cases where accurate band sensitivities are known, the weighting vector, $\vec{w}$, and pan bias, b, can be calculated directly from radiometry measurements. If the model is unknown but linear, standard least squares methods can be used to determine $\vec{w}$ and b. For example, a least squares solution for the weighting vector and pan bias can be determined using the "pseudo-inverse" method. See, for example, W. Press, B. Fannery, S. Teukolsky, W. Vetterling. Numerical Recipes, Chapter 2, Cambridge University Press, 1988. This Press et al. reference is incorporated by reference in this application. For s registered samples, equation (1) can be written in matrix form, $$\begin{bmatrix} \overline{P}_0 \\ \cdot \\ \cdot \\ \cdot \\ \overline{P}_{s-1} \end{bmatrix} = \begin{bmatrix} m_{0,0} & \cdots & m_{0,n-1} & 1 \\ \cdot & & \cdot & \cdot \\ \cdot & & \cdot & \cdot \\ \cdot & & \cdot & \cdot \\ m_{s-1,0} & \cdots & m_{s-1,n-1} & 1 \end{bmatrix} \begin{bmatrix} w_0 \\ w_1 \\ M \\ b \end{bmatrix} + \begin{bmatrix} \varepsilon_0 \\ \cdot \\ \cdot \\ \cdot \\ \varepsilon_{s-1} \end{bmatrix} \quad (2)$$

with associated quadratic form $$J = \varepsilon^T \varepsilon = \sum_{0 \le j < 3} \varepsilon_i^2.$$

The least squares "objective" is to minimize J.

Equation (2) implicitly assumes that pan and MSI intensities correspond to the same spatial areas "on the ground." For example, to align CRSS pan and MSI pixels one would need to aggregate (average) pan intensities over a 4 by 4 area.

Denoting the aggregated pan intensity vector in (2) by $\overline{P}$ and the multispectral sample matrix by M, the minimum value for J occurs when, $$\begin{bmatrix} \vec{w} \\ b \end{bmatrix} = (M^T M)^{-1} M^T \overline{p}. \quad (3)$$

This method works for well-behaved input data. Linearly-dependent (singular) cases can utilize a default weighting vector if nominal band sensitivities are available. To cope with errors introduced by small band-to-band misregistration, both the pan and MSI samples can be averaged over a square region to a common resolution before performing the least squares fit. The size of the square region depends on the degree of misregistration present. The effect of reducing sample resolution is to lower errors caused by band-to-band misregistration. A small example is presented in FIG. 4 of the drawings.

PAN SHARPENING

One prior art method for pan sharpening is to simply resample MSI intensities to pan resolution using standard methods such as nearest neighbor, bilinear, or bicubic interpolation. See, for example, W. K. Pratt, Digital Image Processing, Second Edition, Chapter 14.5, John Wiley and Sons, New York, 1991. This Pratt et al document is incorporated by reference in this application. This will rarely produce crisp output images. Indeed the degree of blurryness of the resultant images will depend on the interpolation scheme used and scene content. Although the prior art method doesn't often produce acceptable results, it is an excellent starting point in a refinement process described below.

Figure 2:
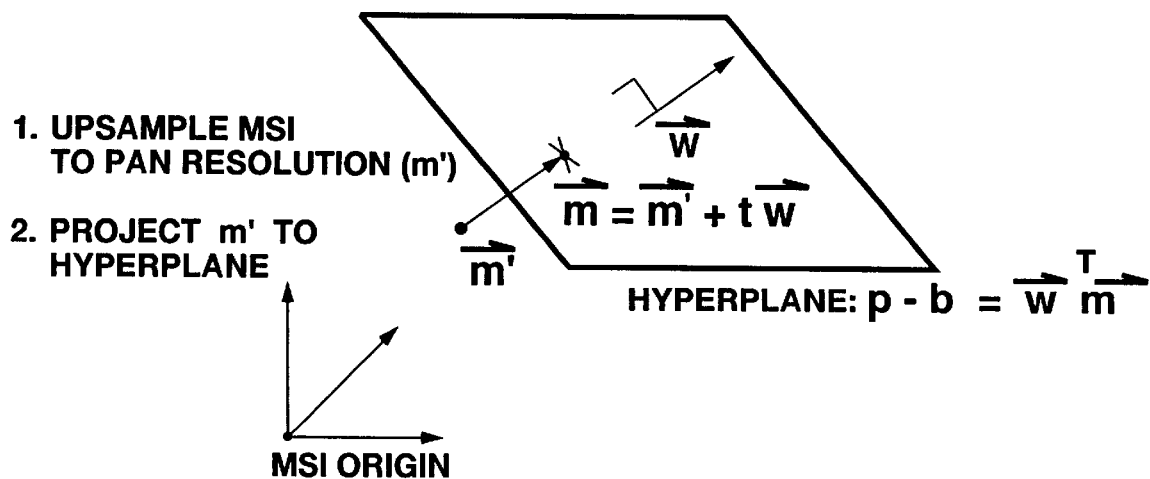
FIG. 2 is a diagram illustrating the projecting of resampled multispectral pixel onto a panchromatic hyperplane defined by $\vec{W}$ and p–b.

The main idea of our method is to adjust resampled MSI intensities to the closest "model" intensity contained in the hyperplane determined by p−b and $\vec{w}$. Each pan intensity, p, determines a different (but parallel) hyperplane. Given the resampled multispectral pixel $\vec{m}$, weighting vector $\vec{w}$, and unbiased pan value p−b, project $\vec{m}'$ to a point, $\vec{m}$, on the plane defined in (1) along the direction $\vec{w}$ (see FIG. 2). Note that $\vec{m}$ will be projected to the nearest point on the hyperplane defined by p−b and $\vec{w}$.

Solving the equations for the projection is straightforward. Recalling elementary geometry, the closest point on a hyperplane to a given exterior point can be found by starting at the exterior point and projecting to the hyperplane in the direction parallel to a normal on the hyperplane. The normal to the hyperplane in (1) is $\vec{w}$. Let t be a scalar for projecting from $\vec{m}'$ in $\vec{w}$'s direction. The vector point $\vec{m}'+t\vec{w}$ intersects the hyperplane in (1) precisely when, $$p-b=\vec{w}^T(\vec{m}'+t\vec{w}). \tag{4}$$

Solving for t, $$t = \frac{p - b - \vec{w}^T\vec{m}'}{\vec{w}^T\vec{w}}. \tag{5}$$

The equation for an output multispectral pixel intensity is given by, $$m_i=\text{CLAMP}(m_i+tw_i). \tag{6}$$

The CLAMP operator prevents pixel under or over flow on each output band. For a scalar, x, the CLAMP operator can be defined as, $$CLAMP(x)=Max(MinIntensity,Min(x,MaxIntensity)). \tag{7}$$

While I have illustrated and described the the preferred embodiments of my invention, it is to be understood that these are capable of variation and modification, and I therefore do not wish to be limited to the precise details set forth, but desire to avail myself of such changes and alteration as fall within the purview of the following claims.

I claim:

1. A method of combining registered high spatial resolution panchromatic imagery and lower spatial resolution multispectral imagery existing in a plurality of spectral bands to synthesize higher spatial resolution of the multispectral imagery as an ensemble of the plurality of spectral bands, said method comprising, collecting high spatial resolution panchromatic imagery,
collecting lower spatial resolution multispectral imagery existing in a plurality of spectral bands, and initializing the collected imagery to produce a global model relating spatially overlapping multispectral and panchromatic intensities by determining the linear radiometric relationship between the panchromatic imagery and the multispectral imagery bands as an ensemble of the plurality of spectral bands, said initializing compromising,
generating uniformly distributed registered panchromatic and multispectral image samples from the collected panchromatic imagery and the collected multispectral imagery,
determining color weights from the generated panchromatic and multispectral image samples in the form of a weighting vector which is normal to a panchromatic hyperplane containing multispectral imagery intensity vectors and modulated by panchromatic intensities,
and then pixel by pixel panchromatic sharpening processing the multispectral imagery in said ensemble by using the determined color weights and associated panchromatic intensity to produce a sharpened product, said pixel by pixel processing comprising,
spatially resampling the collected multispectral image intensities to panchromatic imagery resolution,
projecting the resampled multispectral image intensities onto said hyperplane to adjust the intensities of the resampled multispectral imagery to the closest global model intensity contained in said hyperplane and to thereby produce a synthesized multispectral imagery which is sharpened to have substantially the spatial resolution of the panchromatic imagery, and
wherein sharpening the imagery in the plurality of spectral bands as an ensemble rather than sharpening the imagery in the plurality of spectral bands sequentially band by band reduces the amount of processing required and reduces the time required for said sharpening of the multispectral imagery.

2. The invention defined in claim 1 including clamping the adjusted intensities of the resampled multispectral imagery to a feasible output range.

3. The invention defined in claim 2 including outputting the clamped adjusted intensities as a sharpened multispectral imagery.

4. The invention defined in claim 1 wherein the spectral resolutions of the multispectral imagery are all within the range of spectral resolution of the panchromatic imagery.

5. The invention defined in claim 1 wherein the spatial resolution of the panchromatic imagery is one unit by one unit and the spatial resolution of the multispectral imagery is four units by four units.

6. The invention defined in claim 1 wherein the collected high spatial resolution panchromatic imagery and the collected lower spatial resolution multispectral imagery cover the same image location on the Earth.

7. The invention defined in claim 1 wherein there are n multispectral bands and wherein there is a panchromatic band having substantially complete spectral overlap with the multispectral bands and wherein there are spatially registered pixels with allowances for slight misregistration, and wherein there is a linear relationship between intensities in the panchromatic band and the multispectral bands and wherein a pan pixel intensity value is denoted as p and wherein there are spatially overlapping multispectral band intensity values), $m_i$ where i=0, . . . , n−1, wherein the global model is mathematically expressed $$p = b + \sum_{0 \leq i < n} w_i m_i + \varepsilon = b + \vec{w}^T \vec{m} + \varepsilon$$

and wherein $\vec{m}$ is a column vector of multispectral imagery intensities, b is a constant additive bias in panchromatic intensity values, and $\varepsilon$ is an error term, and wherein the vector $\vec{w}$ is normal to flee hyperplane containing multispectral imagery intensity vectors at a distance $(p-b)/|\vec{w}|$ from the origin.

8. The invention defined in claim 7 wherein accurate band sensitivities are known and including calculating the weighting vector, $\vec{w}$, and the pan bias, b, directly from radiometry measurements.

9. The invention defined in claim 7 wherein the model is unknown and wherein linear, standard least squares methods are used to determine $\vec{w}$ and b.

10. The invention defined in claim 9 including coping with errors introduced by small band-to-band misregistration by averaging multispectral imagery samples over a square area to a common resolution before performing the least squares fit.

11. Apparatus for combining registered high spatial resolution panchromatic imagery and lower spatial resolution multispectral imagery existing in a plurality of spectral bands to synthesize higher spatial resolution of the multispectral imagery as an ensemble of the plurality of spectral bands, said apparatus comprising, pan means for collecting high spatial resolution panchromatic imagery, MSI means for collecting lower spatial resolution multispectral imagery exiting in a plurality of spectral bands, and model means for initializing the collected imagery to produce a global model relating spatially overlapping multispectral and panchromatic intensities by determining the linear radiometric relationship between the panchromatic imagery and the multispectral imagery bands as an ensemble of the plurality of spectral bands, said model means comprising, generating means for generating uniformly distributed registered panchromatic and multispectral image samples from the collected panchromatic imagery and the collected multispectral imagery, color weight determining means for determining color weights from the generated panchromatic and multispectral image samples in the form of a weighting vector which is normal to a panchromatic hyperplane containing multispectral imagery intensity vectors and modulated by panchromatic intensities, and panchromatic sharpening means for then pixel by pixel panchromatic sharpening processing the multispectral imagery in said ensemble by using the determined color weights and associated panchromatic intensity to produce a sharpened product, said panchromatic sharpening means comprising, spatially resampling means for resampling the collected multispectral image intensities to panchromatic imagery resolution, projecting means for projecting the resampled multispectral image intensities onto said hyperplane to adjust the intensities of the resampled multispectral imagery to the closest global model intensity contained in said hyperplane and to thereby produce a synthesized multispectral imagery which is sharpened to have substantially the spatial resolution of the panchromatic imagery, and wherein sharpening the imagery in the plurality of spectral bands as an ensemble rather than sharpening the imagery in the plurality of spectral bands sequentially band by band reduces the amount of processing required and reduces the time required for said sharpening of the multispectral imagery.

12. The invention defined in claim 11 including clamping means for clamping the adjusted intensities of the resampled multispectral imagery to a feasible output range.

13. The invention defined in claim 12 including output means for outputting the clamped adjusted intensities as a sharpened multispectral imagery.

14. The invention defined in claim 11 wherein the spectral resolutions of the multispectral imagery are all within the range of spectral resolution of the panchromatic imagery.

15. The invention defined in claim 11 wherein the spatial resolution of the panchromatic imagery is one unit by one unit and the spatial resolution of the multispectral imagery is four units by four units.

16. The invention defined in claim 11 wherein the collected high spatial resolution panchromatic imagery and the collected lower spatial resolution multispectral imagery cover the same image location on the Earth.

17. The invention defined in claim 11 wherein there are n multispectral bands and wherein there is a panchromatic band having substantially complete spectral overlap with the multispectral bands and wherein there are spatially registered pixels with allowances for slight misregistration, and wherein there is a linear relationship between intensities in the panchromatic band and the multispectral bands and wherein a pan pixel intensity value is denoted as p and wherein there are spatially overlapping multispectral band intensity values, $m_i$ where $i=0, \ldots, n-1$, wherein the global model is mathematically expressed $$p = b + \sum_{0 \leq i < n} w_i m_i + \varepsilon = b + \vec{w}^T \vec{m} + \varepsilon$$

and wherein m is a column vector of multispectral imagery intensities, b is a constant additive bias in panchromatic intensity values, and $\varepsilon$ is an error term, and wherein the vector $\vec{w}$ is normal to the hyperplane containing multispectral imagery intensity vectors at a distance $(p-b)/|\vec{w}|$ from the origin.

18. The invention defined in claim 17 wherein accurate band sensitivities are known and including calculating means for calculating the weighting vector, $\vec{w}$, and the pan bias, b, directly from radiometry measurements.

19. The invention defined in claim 17 wherein the model is unknown and wherein linear, standard least squares methods are used to determine $\vec{w}$ and b.

20. The invention defined in claim 19 including coping means for coping with errors introduced by small band-to-band misregistration by averaging multispectral imagery samples over a square area to a common resolution before performing the least squares fit.

* * * * *